United States Patent
Wiedyke et al.

(10) Patent No.: US 12,459,321 B1
(45) Date of Patent: Nov. 4, 2025

(54) THREADED CAP FOR UPPER STRUT MOUNT

(71) Applicant: Ford Global Technologies, LLC, Dearborn, MI (US)

(72) Inventors: Zachary Scott Wiedyke, Trenton, MI (US); Andrew Robert Wolf, Northville, MI (US); Ryan Jacob Gardner, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/813,872

(22) Filed: Aug. 23, 2024

(51) Int. Cl.
*B60G 13/00* (2006.01)

(52) U.S. Cl.
CPC ......... *B60G 13/003* (2013.01); *B60G 13/005* (2013.01); *B60G 2204/128* (2013.01); *B60G 2204/129* (2013.01); *B60G 2204/41* (2013.01); *B60G 2204/43* (2013.01)

(58) Field of Classification Search
CPC ............... B60G 13/003; B60G 13/005; B60G 2204/128; B60G 2204/129; B60G 2204/41; B60G 2204/43
See application file for complete search history.

(56) References Cited

U.S. PATENT DOCUMENTS

| | | | | |
|---|---|---|---|---|
| 3,043,581 A | * | 7/1962 | Schmidt | B60G 15/063 267/221 |
| 4,478,396 A | * | 10/1984 | Kawaura | B60G 15/068 267/141.1 |
| 5,009,401 A | * | 4/1991 | Weitzenhof | F16F 9/05 280/124.157 |
| 5,180,186 A | * | 1/1993 | Charles | F16F 9/36 188/282.1 |
| 5,263,692 A | * | 11/1993 | Ito | F16F 13/24 267/140.13 |
| 6,182,953 B1 | * | 2/2001 | Smith | B60G 15/063 267/33 |

(Continued)

FOREIGN PATENT DOCUMENTS

| | | |
|---|---|---|
| EP | 1029719 A1 | 8/2000 |
| EP | 4303042 A1 | 1/2024 |

(Continued)

*Primary Examiner* — Timothy Wilhelm
(74) *Attorney, Agent, or Firm* — Burr & Forman; Lorne Forsythe

(57) ABSTRACT

A strut assembly for a vehicle may therefore be provided. The strut assembly may include a damper which may absorb loading along a longitudinal axis of the damper to reduce ride harshness, a lower strut mount which may operably couple the strut assembly to a control arm of the vehicle, and an upper strut mount which may operably couple the strut assembly to a body of the vehicle. The upper strut mount may include a mounting bracket which may operably couple the upper strut mount to the body, a threaded cap which may be operably coupled to the mounting bracket, and a bushing which may be disposed within the mounting bracket to operably couple the damper to the mounting bracket. The threaded cap may include a first thread which may operably couple to the mounting bracket at a second thread disposed at the aperture of the mounting bracket.

15 Claims, 9 Drawing Sheets

(56) References Cited

U.S. PATENT DOCUMENTS

| | | | | |
|---|---|---|---|---|
| 6,290,218 B1* | 9/2001 | Mayerbock | B60G 15/067 | 280/124.147 |
| 6,394,436 B1* | 5/2002 | Schnaars | B60G 13/003 | 280/124.147 |
| 6,843,352 B2* | 1/2005 | Jacoby | F16F 3/093 | 267/209 |
| 7,108,253 B2* | 9/2006 | Venton-Walters | B60G 13/003 | 267/140 |
| 7,182,189 B2* | 2/2007 | Schutz | B60G 15/067 | 188/321.11 |
| 7,464,919 B2* | 12/2008 | Hermann | B60G 15/068 | 267/293 |
| 7,607,668 B2* | 10/2009 | Dugandzic | B60G 15/068 | 280/86.752 |
| 7,806,392 B2* | 10/2010 | Ishikawa | B60G 15/068 | 267/221 |
| 7,938,418 B1* | 5/2011 | Coombs | B60G 15/068 | 280/124.147 |
| 9,193,241 B2* | 11/2015 | Suchta | B60G 15/067 | |
| 9,315,085 B1* | 4/2016 | Riley | B62D 65/12 | |
| 10,427,484 B2* | 10/2019 | Anderson | B60G 15/068 | |
| 10,570,976 B1* | 2/2020 | Evans | F16F 1/13 | |
| 10,655,703 B2* | 5/2020 | Akiyama | F16F 9/54 | |
| 11,066,099 B2* | 7/2021 | Czajkowski | B60G 7/005 | |
| 11,603,901 B2* | 3/2023 | Zegveld | F16F 9/54 | |
| 11,707,958 B2* | 7/2023 | Jo | B60G 13/003 | 267/220 |
| 11,859,688 B2* | 1/2024 | Bounds | B60G 17/0521 | |
| 11,872,859 B1* | 1/2024 | Gaw | B60G 13/003 | |
| 11,938,777 B1* | 3/2024 | Wong | B60G 17/0272 | |
| 2008/0303233 A1* | 12/2008 | Dugandzic | B62D 17/00 | 280/86.751 |
| 2020/0062065 A1* | 2/2020 | Kirar | F16F 9/0454 | |
| 2020/0063821 A1* | 2/2020 | Ramm | F16F 9/30 | |
| 2020/0406515 A1 | 12/2020 | Lim et al. | | |

FOREIGN PATENT DOCUMENTS

| | | |
|---|---|---|
| JP | 2007091130 A | 4/2007 |
| JP | 7155745 B2 | 10/2022 |

* cited by examiner

THREADED CAP FOR UPPER STRUT MOUNT

TECHNICAL FIELD

Example embodiments generally relate to vehicle suspension components, and more particularly, relate to an upper strut mount that may be capable of withstanding increased loading.

BACKGROUND

Vehicles may commonly employ an independent suspension set up that allows each wheel to move relative to the vehicle body/chassis independent of the other wheels. The components and geometries used for independent suspension designs can vary to some degree. However, a typical independent suspension system will employ struts or shock absorbers (or simply "shocks") that may include dampers which are designed to provide damping for pitch (i.e., oscillation about a vertical axis of the vehicle). The dampers generally resist compression and rebound loading with damping forces that are applied over a range of travel of a piston rod.

Typically, struts are operably coupled to the body, chassis, frame or casted subframe of the vehicle via a mounting interface. However, with the rise in popularity of battery electric vehicles (BEV's), many suspension components may need to be updated to withstand increased loading due to the weight of such vehicles. Accordingly, there may be a need to provide a mounting interface capable of withstanding greater loads for use with heavier vehicles such as BEV's.

BRIEF SUMMARY OF SOME EXAMPLES

In accordance with an example embodiment, a strut assembly for a vehicle may be provided. The strut assembly may include a damper which may absorb compression and rebound loading along a longitudinal axis of the damper to reduce ride harshness, a lower strut mount which may operably couple the strut assembly to a control arm of the vehicle, and an upper strut mount which may operably couple the strut assembly to a body of the vehicle. The upper strut mount may include a mounting bracket which may operably couple the upper strut mount to the body, a threaded cap which may be operably coupleable to an aperture of the mounting bracket, and a bushing which may be disposed within the aperture of the mounting bracket to operably couple the damper to the mounting bracket. The threaded cap may include a first thread which may operably couple to the mounting bracket at a second thread which may be disposed at the aperture of the mounting bracket.

In another example embodiment, an upper strut mount for a strut assembly for a vehicle may be provided. The upper strut mount may include a mounting bracket which may operably couple the upper strut mount to the body, a threaded cap which may be operably coupleable to an aperture of the mounting bracket, and a bushing which may be disposed within the aperture of the mounting bracket to operably couple the damper to the mounting bracket. The threaded cap may include a first thread which may operably couple to the mounting bracket at a second thread which may be disposed at the aperture of the mounting bracket.

In yet another example embodiment, a suspension system for a vehicle may be provided. The suspension system may include a wheel operably coupled to a control arm, a body of the vehicle, and a strut assembly which may be disposed between the control arm and the body. The strut assembly may include a damper which may absorb compression and rebound loading along a longitudinal axis of the damper to reduce ride harshness, a lower strut mount which may operably couple the strut assembly to a control arm of the vehicle, and an upper strut mount which may operably couple the strut assembly to a body of the vehicle. The upper strut mount may include a mounting bracket which may operably couple the upper strut mount to the body, a threaded cap which may be operably coupleable to an aperture of the mounting bracket, and a bushing which may be disposed within the aperture of the mounting bracket to operably couple the damper to the mounting bracket. The threaded cap may include a first thread which may operably couple to the mounting bracket at a second thread which may be disposed at the aperture of the mounting bracket.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
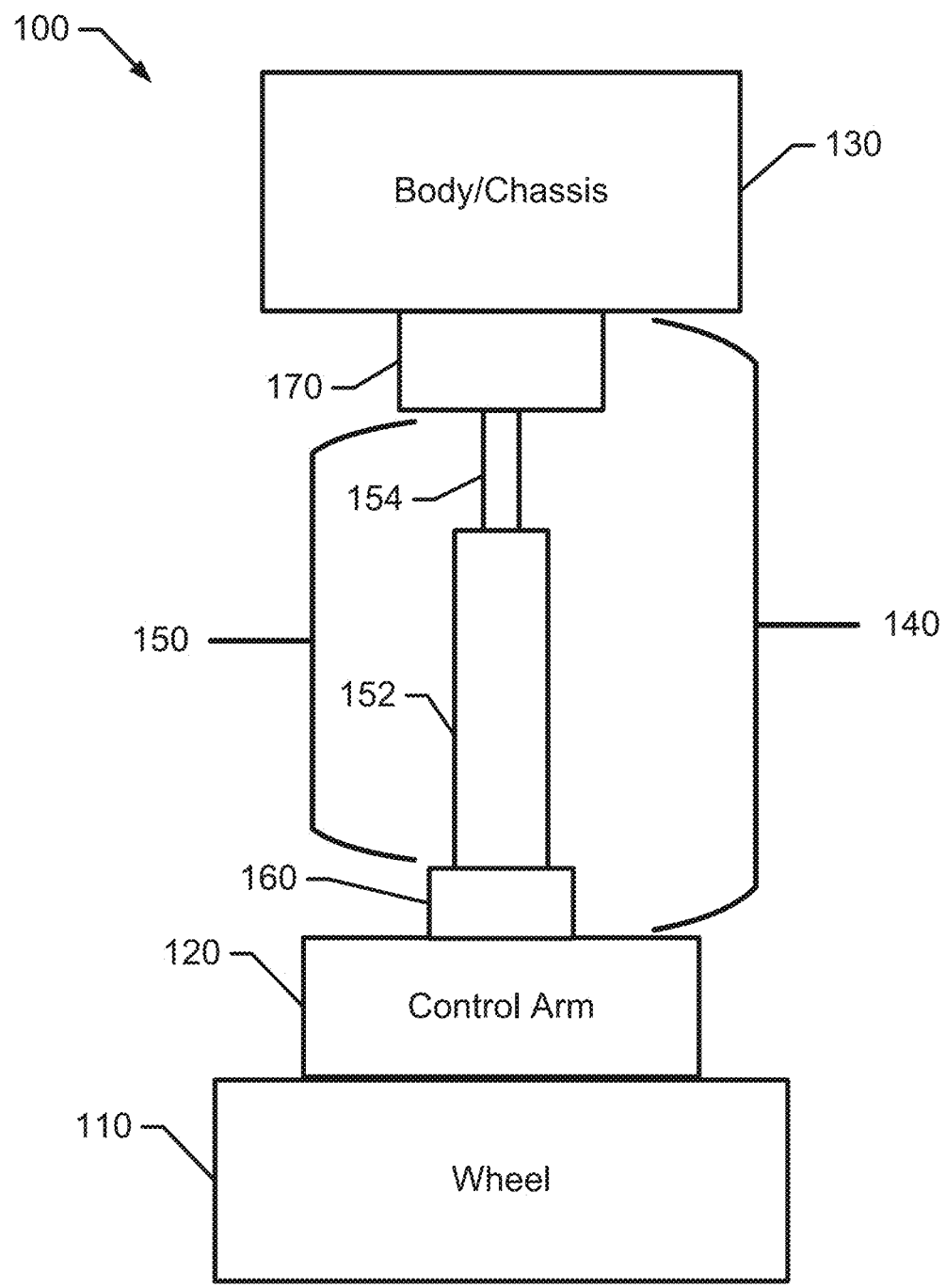
FIG. 1 illustrates a block diagram of a vehicle suspension system in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Upper strut mounts may often include a cap that may be operably coupled to a mounting bracket of the upper strut mount. The cap may retain a bushing of the strut assembly within an aperture of the mounting bracket to operably couple the damper to the mounting bracket. In this regard, a piston rod of the damper may extend into and through the aperture of the mounting bracket where it may operably couple to the mounting bracket via the bushing and cap. During operation of the vehicle, the damper may absorb compression and rebound load forces to reduce the ride harshness of the vehicle. In doing so, the damper may apply forces onto the cap via the piston rod and bushing. In order to keep the damper and bushing operably coupled with the mounting bracket, the cap may need to withstand such forces to hold the upper strut mount together. Currently, common practice may be for the cap to be operably coupled to the mounting bracket via a c-clip or ring disposed within a groove, or via manipulating the mounting bracket material during manufacturing. However, both of these methods of operably coupling the cap to the mounting bracket may reduce the load capacity of the upper strut mount.

In a non-limiting example, some embodiments may provide an upper strut mount that may be more robust and therefore more capable of withstanding greater loading due to the weight of the vehicle. Some embodiments may provide for a threaded cap that may operably couple to the mounting bracket of the upper strut mount by engaging first and second threads. The threaded operable coupling of the cap to the mounting bracket may increase the load capacity of the upper strut mount by distributing load forces evenly along the threads rather than isolating the forces at any particular location within the mounting bracket.

FIG. 1 illustrates a block diagram of a suspension system 100 of a vehicle in accordance with an example embodiment. The suspension system 100 may include a wheel 110, a control arm 120, a body 130 of the vehicle, and a strut assembly 140. The wheel 110 may be operably coupled to a multiple other components, one of which may be the control arm 120. The control arm 120 may be operably coupled to the wheel 110 via a knuckle or a wheel hub or another similar type of interface. In this regard, the control arm 120 may enable the wheel 110 to articulate up and down relative to the body 130 as the vehicle traverses various terrain, but will prevent the wheel 110 from moving forward or rearward relative to the body 130. Articulation of the wheel in the vertical direction may play an important role in reducing the harshness of the ride of the vehicle, as will be described in greater detail below in further reference to FIG. 1. The control arm 120 may be operably coupled to the body 130 of the vehicle both via the strut assembly 140, and perhaps directly to the body 130 as well. Importantly, as used herein, the term body 130 may refer to the portion of the vehicle in which passengers and the operator may ride, or to the chassis, frame, casted subframe, etc. of the vehicle. As such, the term body 130 may, in some cases, be interchangeable with terms such as chassis, frame, casted subframe, among others. While some vehicles may be constructed in a body-on-frame manner, many modern vehicles may be manufactured using unibody construction or casted subframe construction. Regardless of the manner in which the vehicle may be constructed, the control arm 120 may be operably coupled to the body 130 of the vehicle via control arm bushings (not shown), and via the strut assembly 140.

The strut assembly 140 may, among other things, dampen compression and rebound load forces between the body 130 and the wheel 110. Bumps or obstacles in terrain over which the vehicle may traverse may cause the wheel 110 to articulate varying amounts depending on how the vehicle is driven, the size of the change in the terrain, and the weight of the vehicle. Thus, the vehicle's suspension system 100 may articulate responsive to traversing uneven terrain to absorb some of the vertical motion of the wheel 110. In doing so, the suspension system 100 may reach full compression at certain points depending on the articulation distance the wheel 110 may travel. In other words, in some cases, the suspension system 100 may be at full compression when the wheel 110 moves as close to the body 130 as the strut assembly 140 may allow. At full compression, there may be potential for the wheel 110 to impart compression force on other components in the suspension system 100. Compression loading on the suspension system 100 may be significantly greater in cases where the vehicle may be a BEV, because BEV's may often be heavier than comparably sized internal combustion engine (ICE) vehicles. Withstanding such increased loading may require modifications to the suspension system 100, as will be described herein.

In some embodiments, the strut assembly 140 may operably couple the body 130 to the control arm 120, and thus indirectly to the wheel 110 via the control arm 120. The strut assembly 140 may include a damper 150, a lower strut mount 160 operably coupling the strut assembly 140 to the control arm 120 and an upper strut mount 170 operably coupling the strut assembly 140 to the body 130. The damper 150 may function to absorb compression and rebound loading along a longitudinal axis 180 of the damper 150. In some cases, the damper 150 may be operably coupled to the body 130 by the upper strut mount 170 at a first end of the damper 150 and to the control arm 120 by the lower strut mount 160 at a second end of the damper. In this regard, the damper 150 may significantly reduce ride harshness as perceived by passengers within the vehicle by dampening the articulation motion of the wheel 110 so that the articulation of the wheel 110 is not directly transferred to the body 130 of the vehicle. In an example embodiment, the damper 150 may be a vertical damper that, in some other cases, may be referred to as a shock absorber. In some cases, the damper 150 may include a cylindrical shaped casing 152 and a piston rod 154 disposed within the casing 152. The casing 152 may be operably coupled to the lower strut mount 160 and the piston rod 154 may be operably coupled to the upper strut mount 170. The piston rod 154 may be slidably operably coupled to the inside of the casing 152, and may be slidable relative to the casing 152 along the longitudinal axis 180. Disposed within the casing 152 may be a hydraulic fluid, and submerged within the hydraulic fluid, the piston rod 154 may include a check valve.

In this regard, as the vehicle traverses uneven terrain and the wheel 110 articulates towards the body 130, the piston rod 154 may slide deeper into the casing 152 due to the compression loading force. While the damper 150 compresses, the piston rod 154 may move through the hydraulic fluid contained in the casing 152, forcing the hydraulic fluid to flow through the check valve operably coupled to the piston rod 154. By forcing the hydraulic fluid to flow through the check valve, the piston rod 154 may move slowly through the hydraulic fluid, and may also resist sudden movements of the piston rod 154. Thus, the damper 150 may resist the sudden movement of the wheel 110 towards the body 130, which may reduce the ride harshness of the vehicle. In some cases, the damper 150 may be a monotube shock absorber, a twin-tube shock absorber, or a bladder shock absorber depending on the type of vehicle or the desired damping control. In an example embodiment, the damper 150 may be active, semi-active, or passive. In an example embodiment, the active or semi-active damper may utilize measurements from a sensor suite of the vehicle to adjust the damper accordingly.

Figure 2:
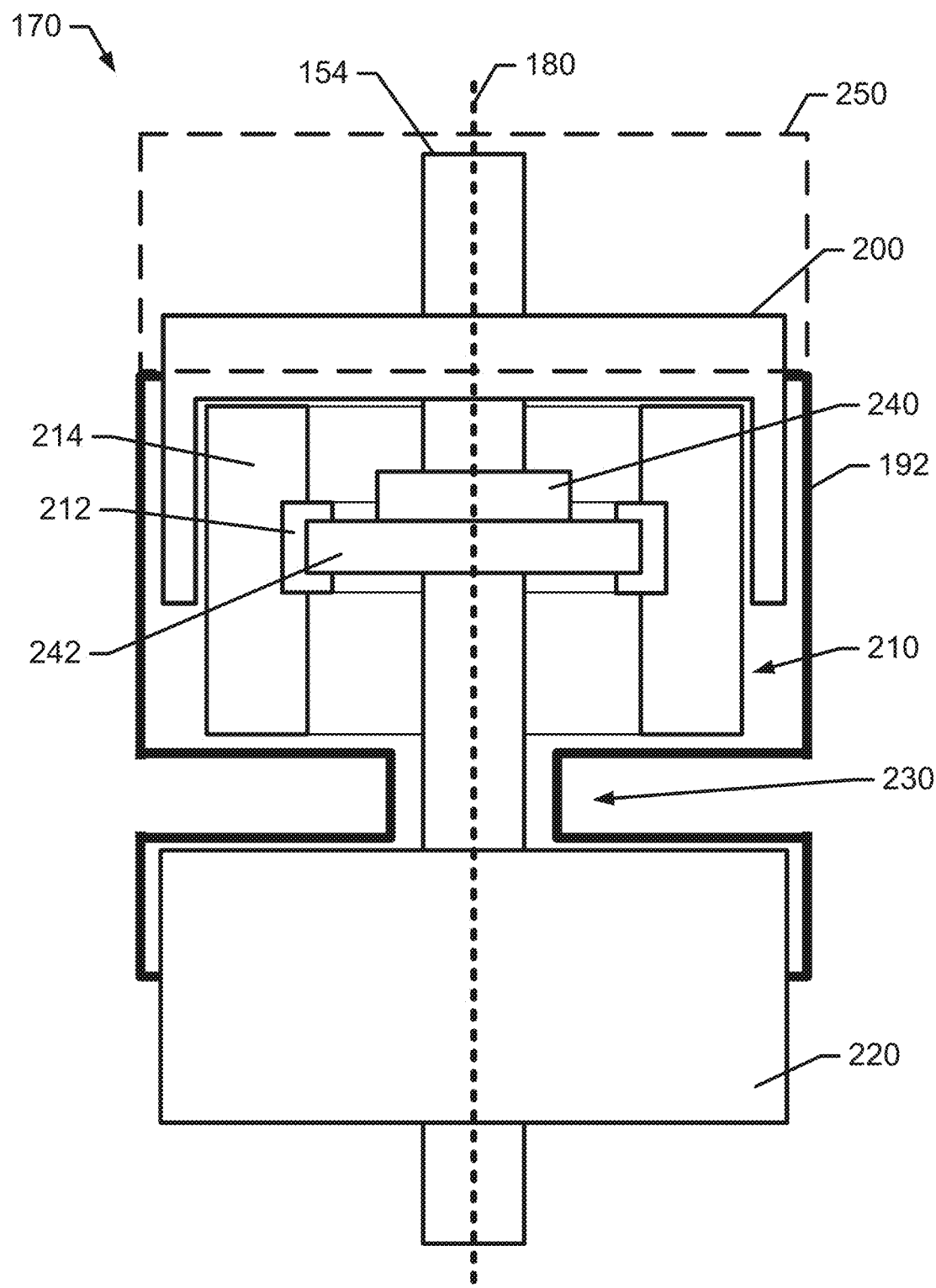
FIG. 2 illustrates block diagram of the upper strut mount in accordance with an example embodiment.

FIG. 2 depicts a close-up block diagram showing a cross section view of the upper strut mount 170 from FIG. 1 in accordance with an example embodiment. The upper strut mount 170 of FIG. 2 may include a mounting bracket 190 operably coupling the upper strut mount 170 to the body 130, a threaded cap 200 operably coupleable to an aperture 192 of the mounting bracket 190, and a bushing 210 disposed within the aperture 192 of the mounting bracket 190 to operably couple the damper 150 to the mounting bracket 190. In some cases, the mounting bracket 190 may operably couple to the body 130 via a fastener or a plurality of fasteners, which are not depicted in the block diagram of FIG. 2. The mounting bracket 190 may receive the piston rod 154 of the damper 150 in the aperture 192, which may be a hollow central region extending entirely through the mounting bracket 190. In this regard, the aperture 192 may be thought of as a bore through the mounting bracket 190, and as such, it may be substantially cylindrical in shape. In other words, the aperture 192 may be bound by an inner surface 194 of the mounting bracket 190 that may extend around, and define the shape of, the aperture 192. The aperture 192 may be open at a first end 196 of the mounting bracket 190, proximate to the body 130, and also at a second end 198 of the mounting bracket 190, proximate to the damper 150. The aperture 192 may refer to the open/hollow area inside the mounting bracket 190, which in FIG. 2, is shown outlined by the darkest/thickest black line.

At the second end 198 of the mounting bracket 190, the upper strut mount 170 may include a bump stop 220. The bump stop 220 may be disposed in the aperture 192 but may extend out of the aperture 192, around the piston rod 154 and towards the casing 152. In this regard, the bump stop 220 may act as a cushion or a spacer between the damper 150 and the mounting bracket 190. For example, if the wheel 110 were to experience large and sudden articulation towards the body 130, then the damper 150 may compress rapidly to an end of a range of travel of the damper 150. In such cases, there may be a chance that the casing 152 of the damper 150 may come into contact with the mounting bracket 190, which may transfer a compression load force onto the mounting bracket 190. This may be referred to as the suspension "bottoming out" and it may be ideal to avoid the suspension bottoming out to increase the longevity of the various suspension components, including the mounting bracket 190. Accordingly, with the bump stop 220 operably coupled to the aperture 192 at the second end 198 of the mounting bracket 190, the likelihood of the mounting bracket 190 contacting the damper 150 during compression loading is greatly reduced, which may increase the longevity of the suspension system 100. In an example embodiment, the bump stop 220 may be manufactured from a foam material capable of compressing and absorbing contact from the casing 152. In some other cases, the bump stop 220 could be manufactured from a rubber or polymer material as well.

Directly above the bump stop 220 and separating the bump stop 220 from the bushing 210 may be a rib 230. The rib 230 may be a protrusion of the mounting bracket 190 that may extend into the aperture 192 perpendicularly from the inner surface 194. The rib 230 may effectively reduce the inner diameter of the aperture 192 so that only the piston rod 154 may pass by the rib 230. As such, the rib 230 may support the bump stop 220 on one side of the rib 230, and the bushing 210 on the other. In some cases, the rib 230 may include a lip 232 that may operably couple the bushing 210 to the aperture 192. In an example embodiment, the rib 230 may simply be an extrusion of the inner surface 194 that may partition the aperture 192 between the bump stop 220 and the bushing 210. In some cases, the rib 230 may be arcuate on at least one side of the rib 230. In this regard, a base of the aperture 192 may be rounded into a bowl-like shape where the rib 230 may define the bottom of the "bowl". In such cases, the rib 230 may include an orifice through which the piston rod 154 may extend from the second end 198 of the mounting bracket 190 towards the first end 196. Additionally, the bushing 210 may be shaped to conform to the shape of the aperture 192 as defined by the rib 230. As such, the bushing 210 may also be arcuate to operably couple to the aperture 192 and be supported by the rib 230 accordingly.

Together, the threaded cap 200 and the bushing 210 may operably couple the piston rod 154 of the damper 150 to the mounting bracket 190. In this regard, the threaded cap 200 may enclose the bushing 210 between the threaded cap 200 and the inner surface 194 of the aperture 192. The bushing 210 may be disposed between the rib 230 and the threaded cap 200. The bushing 210 may be axially fixed to the piston rod 154 via a washer 242 and a fastener 240. As such, in the axial direction along the longitudinal axis 180, the bushing 210 may move as one with the piston rod 154. Therefore, since the bushing 210 is "sandwiched" between the threaded cap 200 and the rib 230, the bushing 210 may effectively be operably coupled to the mounting bracket 190. This operable coupling may allow the damper 150 to absorb loading between the body 130 and the wheel 110 indirectly via the control arm 120. As will be described below in reference to FIGS. 6-9, the threaded cap 200 may be threadably operably coupled to the aperture 192 and thus to the mounting bracket 190.

In some cases, the upper strut mount 170 may optionally further include a dust shield 250. The dust shield 250 may be operably coupled to the mounting bracket 190 to enclose and seal the aperture 192 and the components contained within the aperture 192 such as the threaded cap 200, from dust, debris, water and any other potential materials. As such, the dust shield 250 may reduce the likelihood that the components disposed in the aperture 192 rust, corrode, or collect debris. The dust shield 250 may also sometimes be referred to as a beauty cap because the dust shield 250 may also give the upper strut mount 170 a cleaner overall look by visually concealing the components described above underneath the dust shield 250 and within the mounting bracket 190. In an example embodiment, the dust shield 250 may be operably coupled to the threaded cap 200 via a set of tension clips 252 that may insert into a drive feature 202 on the threaded cap 200. In this regard, the tension clips 252 may include protrusions that, when inserted into the drive feature 202 of the threaded cap 200, may grab onto the edges of the drive feature 202 to operably couple the dust shield 250 to the threaded cap 200, and thus to the aperture 192 in which the threaded cap 200 may be disposed.

Figure 3:
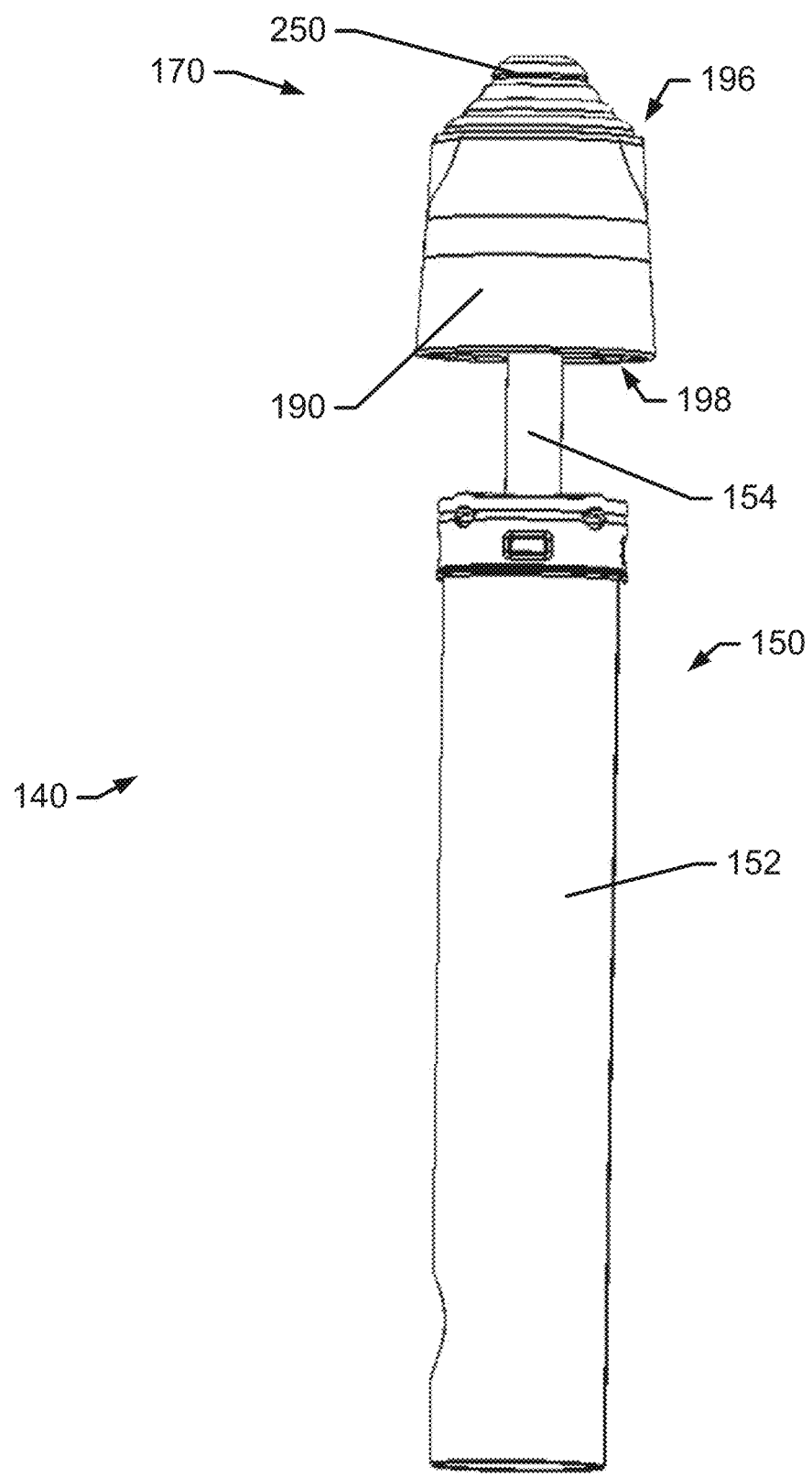
FIG. 3 illustrates a side view of the strut assembly in accordance with an example embodiment.
Figure 4:
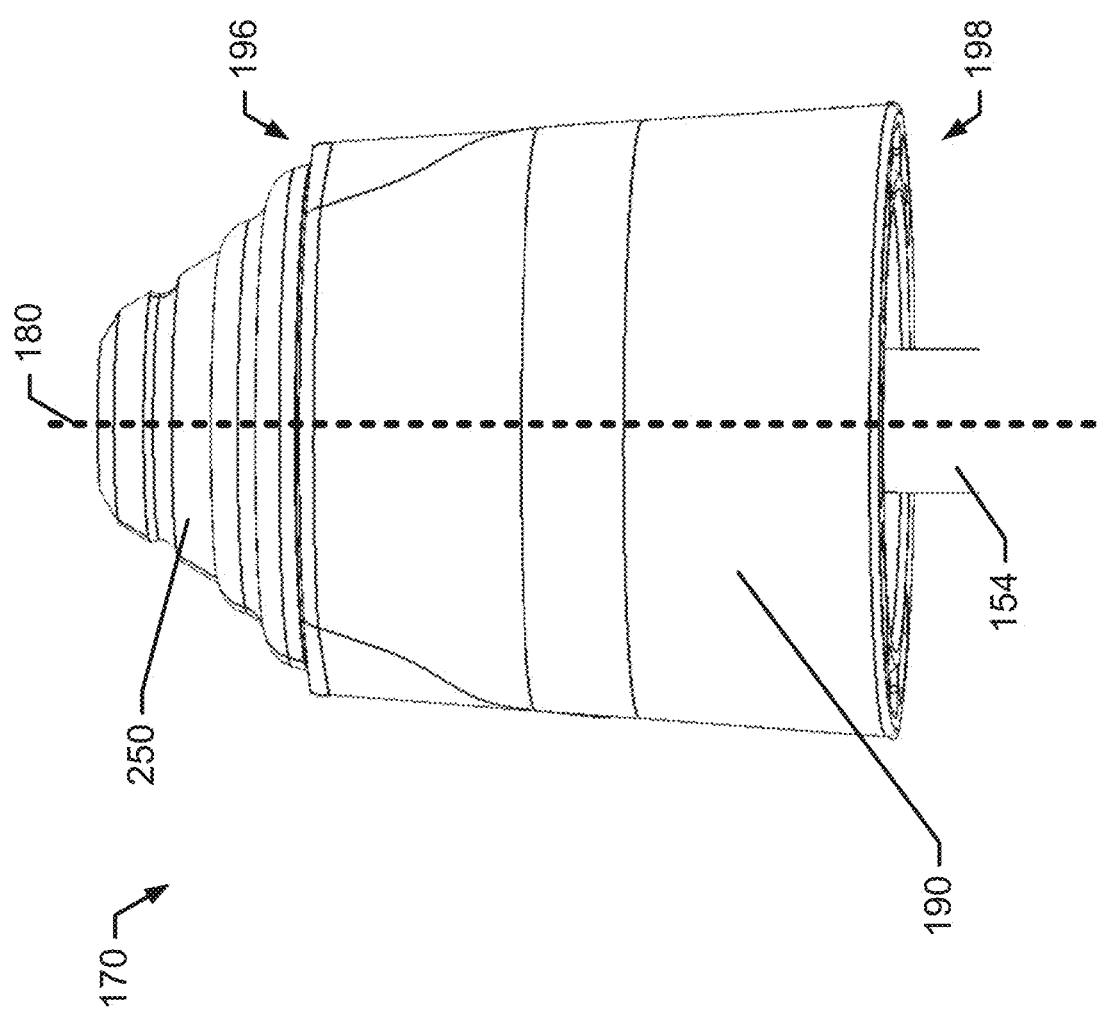
FIG. 4 illustrates a side view of the upper strut mount in accordance with an example embodiment.
Figure 5:
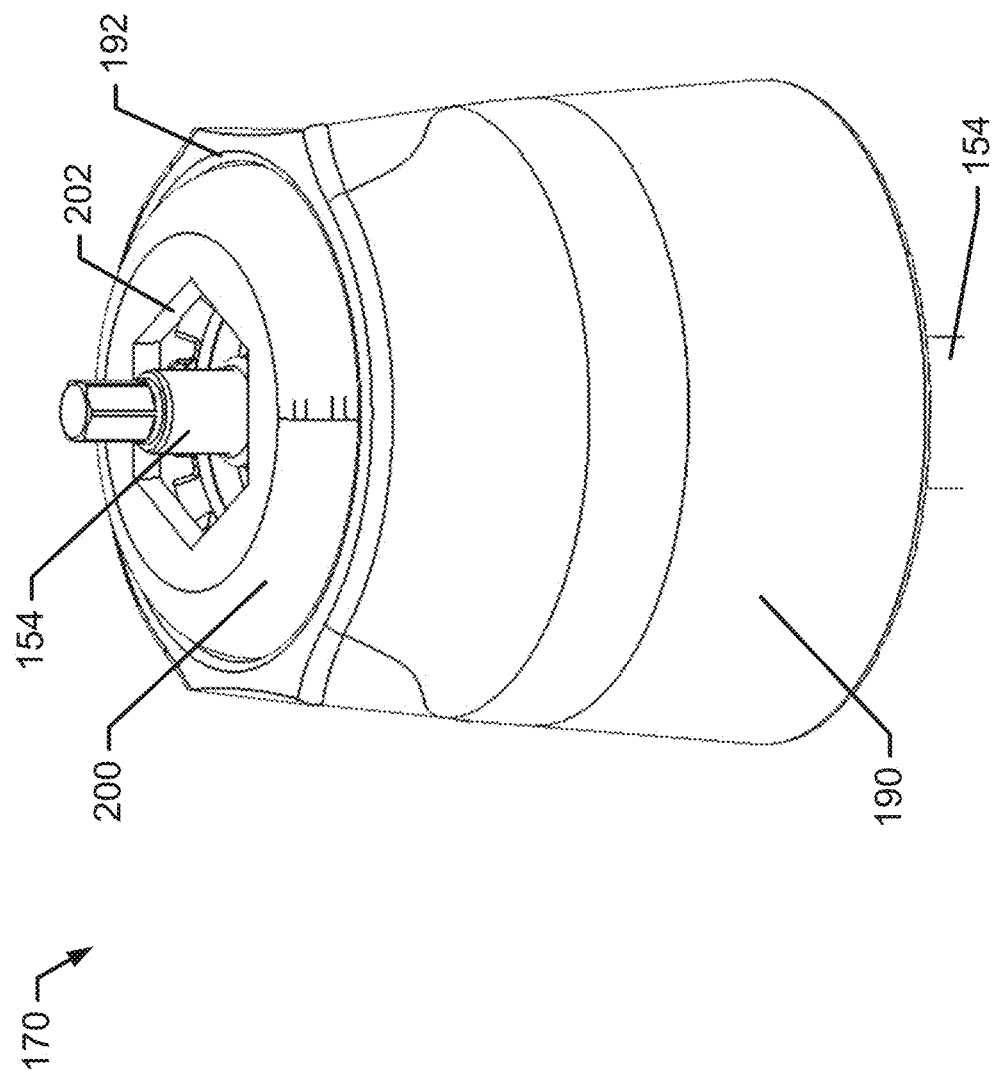
FIG. 5 illustrates a perspective view of the upper strut mount in accordance with an example embodiment.

FIG. 3 depicts a side view of the strut assembly 140, and FIGS. 4 and 5 depict side and perspective views, respectively, of the upper strut mount 170 according to an example embodiment. The strut assembly 140 of FIG. 3 does not show the lower strut mount 160 for simplicity, but a lower strut mount 160 may operably couple the damper 150 to the control arm 120. As described above, as the wheel 110 articulates, the control arm 120 may move up and down with it relative to the body 130 of the vehicle. Accordingly, the damper 150 disposed therebetween may dampen the motion of the control arm 120 relative to the body 130 and the loading that arises from this movement. In some cases, the body 130 may be fitted with an adapter component that may be configured to operably couple to the mounting bracket 190. In this regard, the specific structure of the body 130 of the vehicle, while not shown, may not always be conducive to operably coupling directly to the mounting bracket 190. As such, in some cases, the adapter may be used as an intermediate component to facilitate operably coupling the mounting bracket 190 to the body 130.

Also shown in FIGS. 3 and 4, the dust shield 250 may be operably coupled to the mounting bracket 190 to enclose and seal the aperture 192, which may be contained within the central region of the mounting bracket 190. In some other example embodiments, the mounting bracket 190 may take on a variety of shapes and/or sizes. In other words, the mounting bracket 190 shown herein may be modified, or visually altered, to adapt to operably couple with the body 130 of the particular vehicle on which the suspension system 100 may be embodied. Of note, FIGS. 3-5 also depict the strut assembly 140 without the bump stop 220 disposed at the upper strut mount 170. As mentioned above, in some example embodiments, the bump stop 220 may be operably coupled to the mounting bracket 190 at the aperture 192 and disposed between the mounting bracket 190 and the casing 152 of the damper 150.

Figure 6:
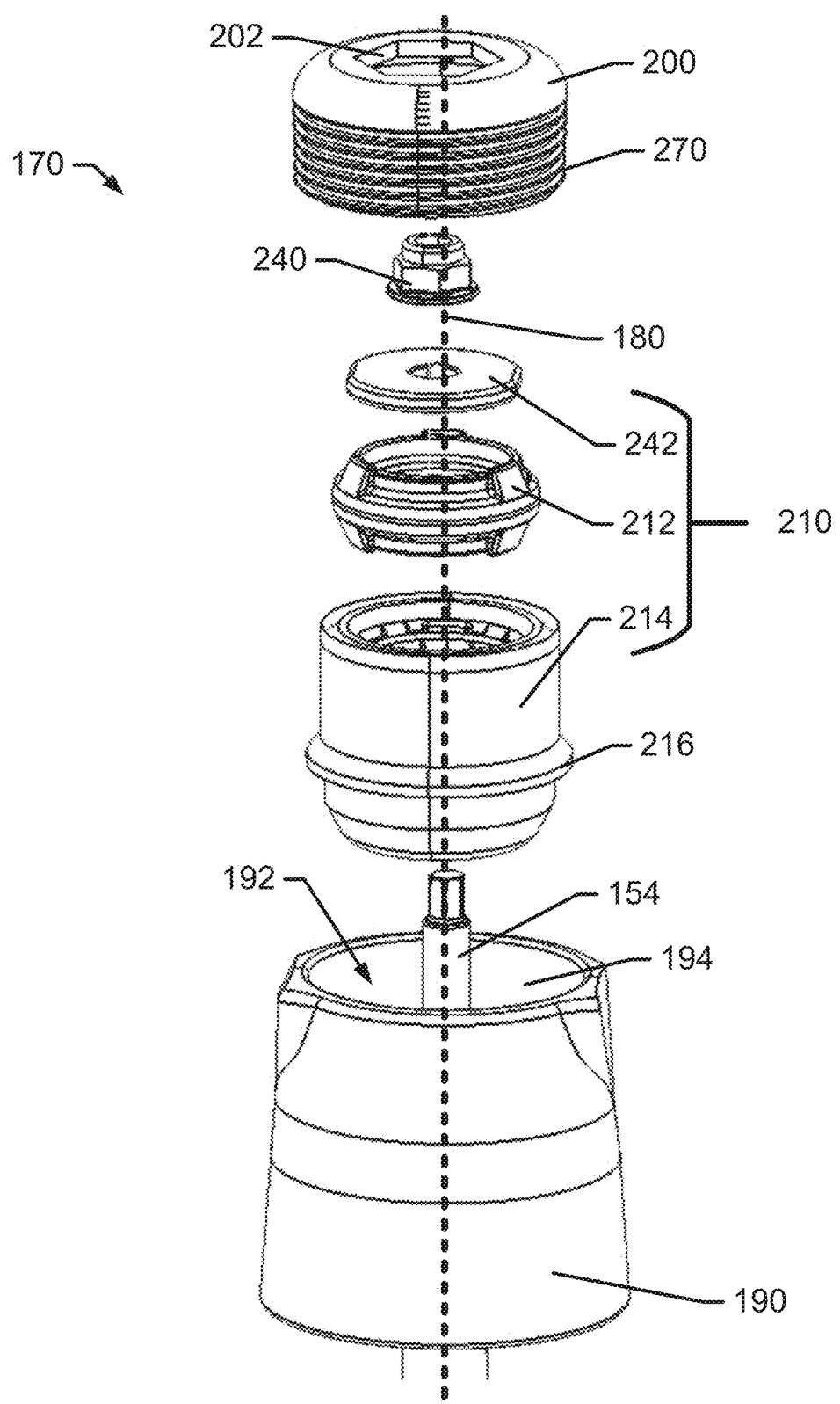
FIG. 6 illustrates an exploded view of the upper strut mount in accordance with an example embodiment.

FIG. 6 depicts an exploded view of the upper strut mount 170 according to an example embodiment. In this view, the components of the upper strut mount 170 are laid out to in roughly the order in which they are disposed in the aperture 192. Foremost, the piston rod 154 may be inserted through the aperture 192 and may extend entirely through the mounting bracket 190. As such, the aperture 192 may be centered around the longitudinal axis 180 of the damper 150. The piston rod 154 may have a significantly smaller diameter than the aperture 192, and as such the remaining components within the aperture 192 may be substantially annular and may slot onto the piston rod 154 and encircle the piston rod 154 accordingly. In this regard, the bushing 210 may be inserted into the aperture 192 around the piston rod 154 and may be slid down the piston rod 154 until it may be supported on the rib 230 as described above. In some cases, the bushing 210 may include an overmold portion 212 and an isolator portion 214. The overmold portion 212 may be disposed inside of the isolator portion 214 such that the isolator portion 214 prevents the overmold portion 212 from contacting the inner surface 194 of the aperture 192. In an example embodiment, the isolator portion 214 may include a flange 216 that may extend annularly around the isolator portion 214. The flange 216 may engage the lip 232 when the bushing 210 is disposed within the aperture 192. In this regard, the inner surface 194 of the aperture 192 may be configured to operably couple to the bushing 210 by receiving the flange 216 at the lip 232 to ensure proper fitment of the bushing 210 within the aperture 192. In some cases, the isolator portion 214 of the bushing 210 may be formed from a rubber material which may enable the damper 150 to flexibly operably couple to the mounting bracket 190 and may also reduce the transmission of vibrations from the damper 150 to the mounting bracket 190 and thus the body 130. The shape of the isolator portion 214 may securely operably couple the damper 150 to the mounting bracket 190. In this regard, responsive to the damper 150 absorbing rebound and compression load forces, the bushing 210 may not move relative to the mounting bracket 190 within the aperture 192. In this regard, the bushing 210 may be secured on top by the threaded cap 200, as will be described below in reference to FIG. 7, and on the bottom by the rib 230. In other words, the bushing 210 may be sandwiched between the threaded cap 200 and the rib 230 of the aperture 192 to operably couple the damper 150 to the mounting bracket 190.

The overmold portion 212 may operably couple the isolator portion 214 to the piston rod 154. The bushing 210 may be fixed in place axially along, and disposed around, the longitudinal axis 180 and the piston rod 154, so that the piston rod 154 cannot move axially along the longitudinal axis 180 relative to the bushing 210. In other words, if the piston rod 154 were to move axially along the longitudinal axis 180, then the bushing 210 may move with it. This is because the bushing 210 may be axially fixed to the piston rod 154 via the washer 242 and the fastener 240. As such, the bushing 210 may move as one with the piston rod 154. In some cases, the washer 242 may directly contact the overmold portion 212 to ensure a secure operable coupling of the bushing 210 to the piston rod 154. The fastener 240 may then be threaded onto a threaded portion of the piston rod 154 to axially fix the bushing 210 to the piston rod 154. In an example embodiment, the washer 242 may be disposed within the bushing 210 and may be manufactured as part of the bushing 210. In this regard, the washer 242 may, in some cases, be disposed within the overmold portion 212. In such cases, the fastener 240 may be inserted into the overmold portion 212 to engage the washer 242 to operably couple the bushing 210 to the piston rod 154.

Figure 7:
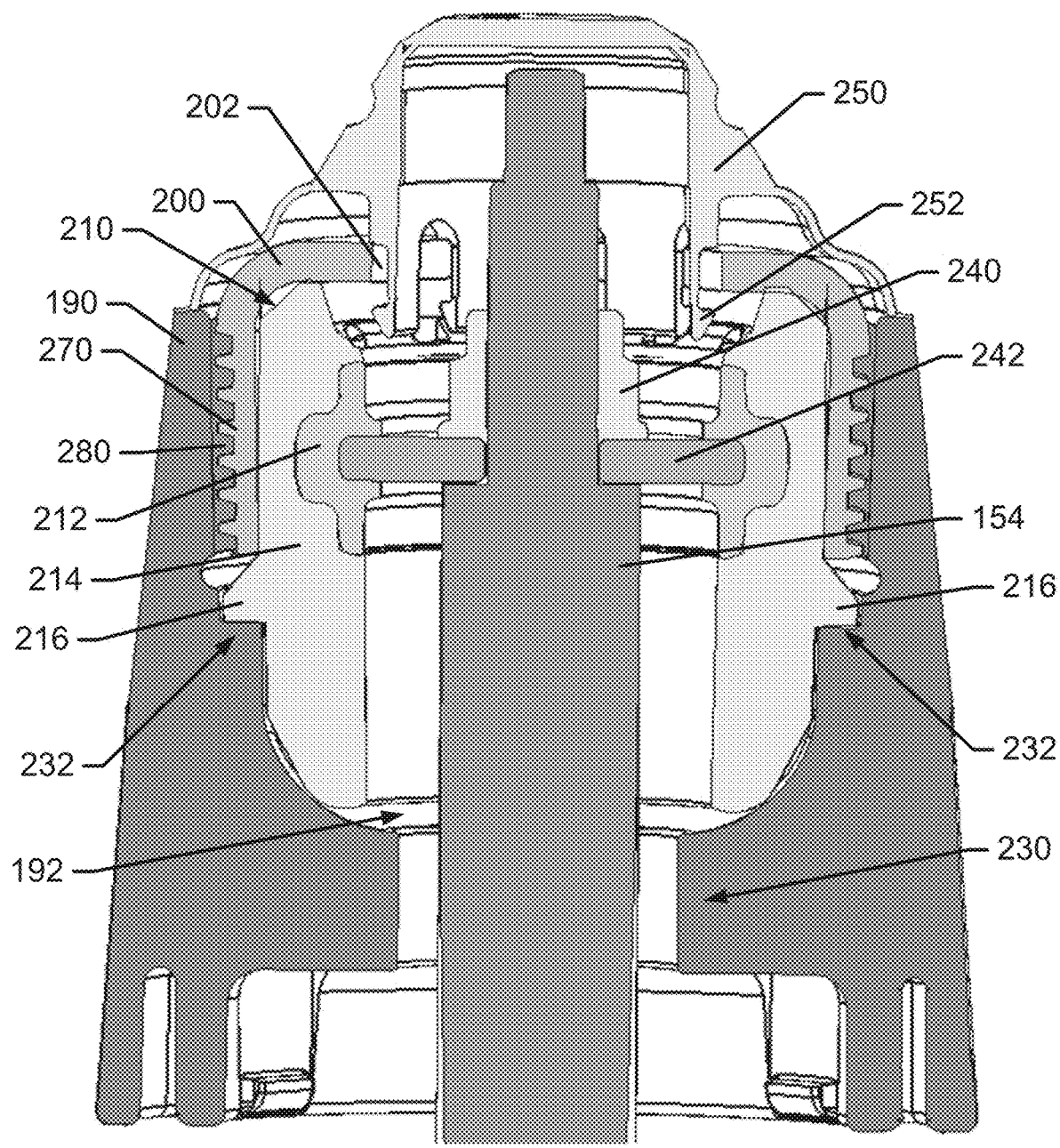
FIG. 7 illustrates a section view of the upper strut mount in accordance with an example embodiment.
Figure 8:
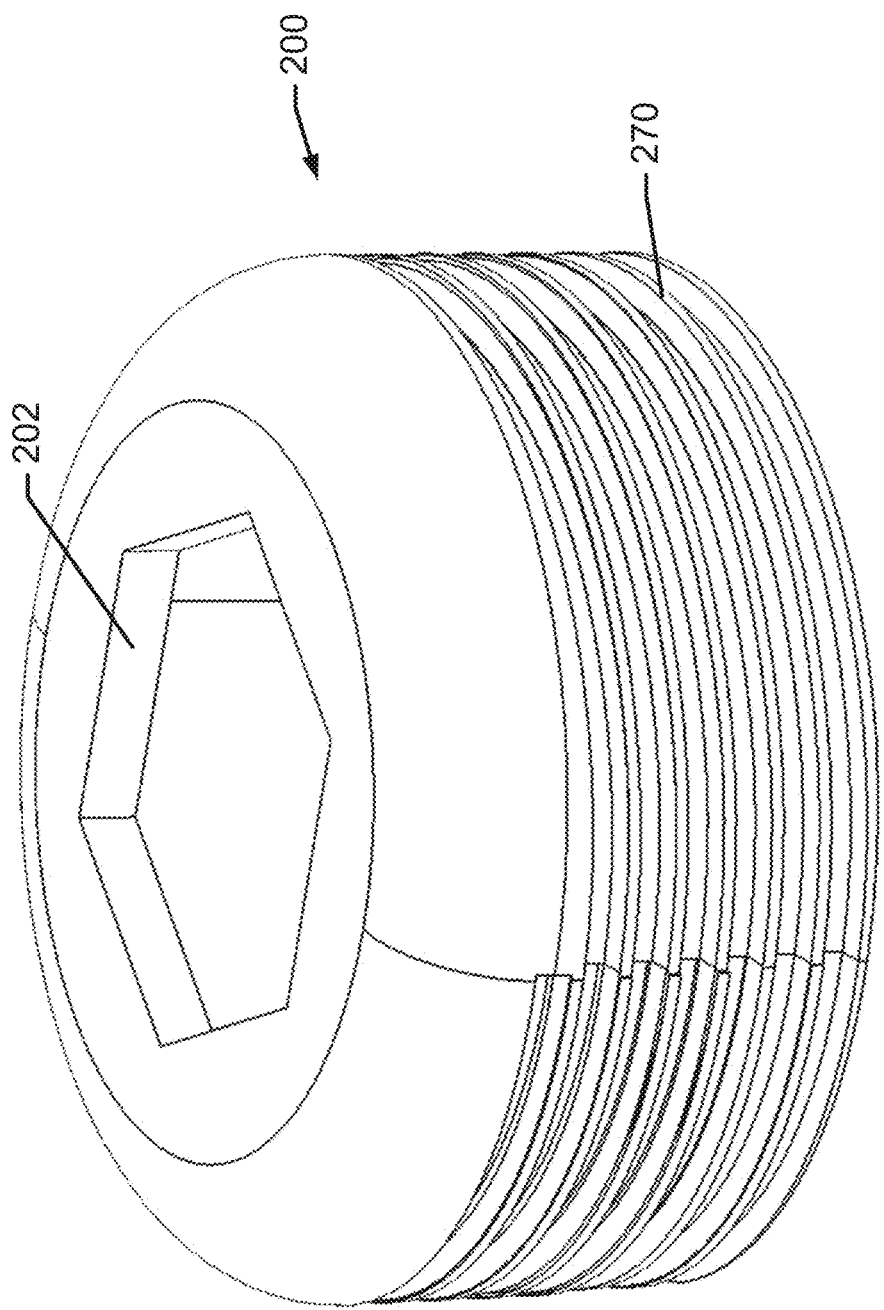
FIG. 8 illustrates a perspective view of the threaded cap in accordance with an example embodiment.
Figure 9:
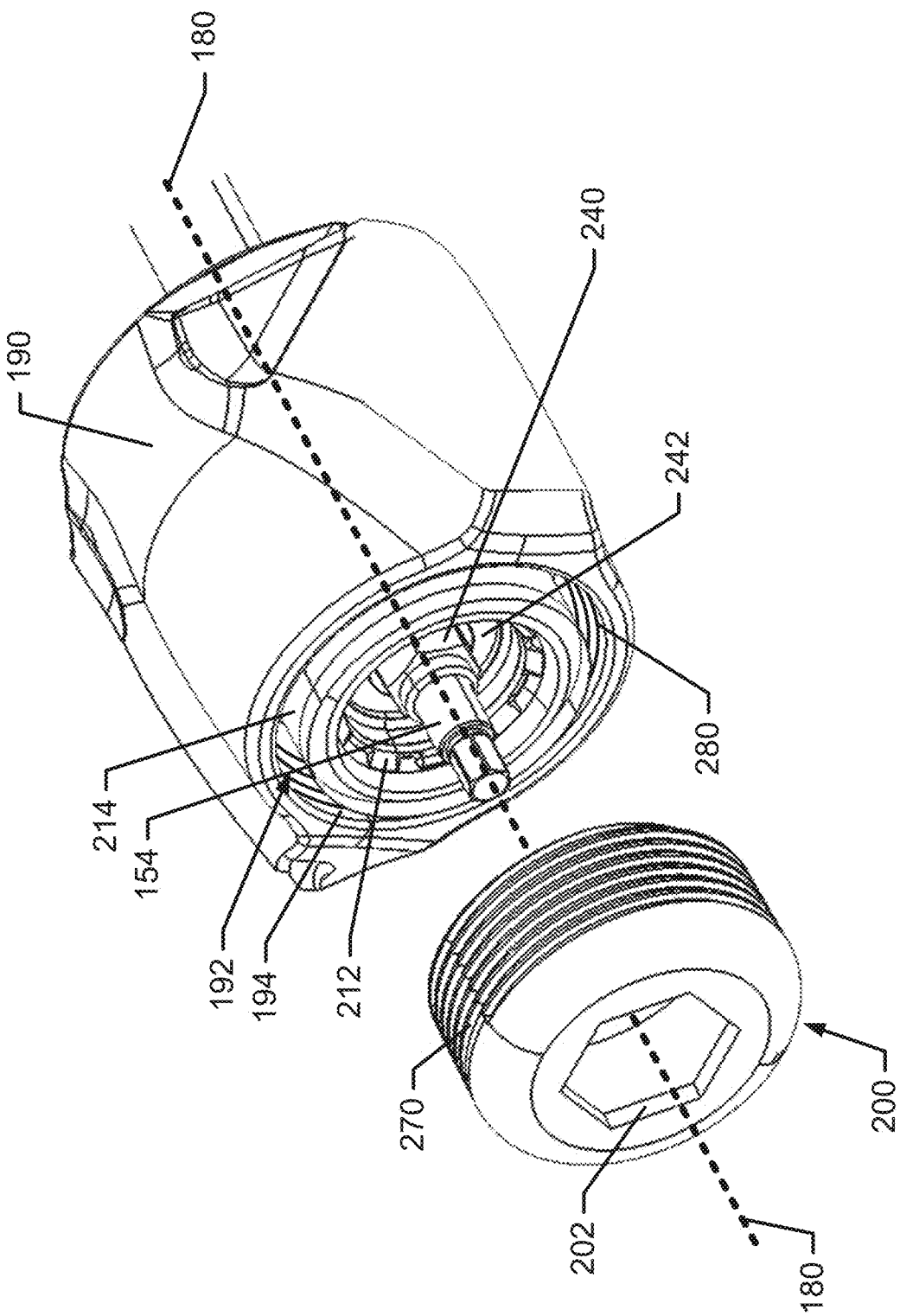
FIG. 9 illustrates a perspective view of the upper strut mount in accordance with an example embodiment.

FIG. 7 depicts a cross section view taken through the mounting bracket 190 and showing the aperture 192 and the components disposed therein according to an example embodiment. FIG. 8 shows a perspective view of the threaded cap 200 in accordance with an example embodiment, and FIG. 9 shows the threaded cap 200 being threaded into the aperture 192 according to an example embodiment. After the bushing 210, the washer 242 and the fastener 240 are all inserted into the aperture 192 and operably coupled to the piston rod 154, the upper strut mount 170 may resemble the upper strut mount 170 shown in FIG. 9. The threaded cap 200 may then be threadably operably coupled to the aperture 192. In this regard, the threaded cap 200 may include a first thread 270 which may operably couple the threaded cap 200 to the mounting bracket 190 via engagement with a second thread 280, which may be disposed at the inner surface 194 of the aperture 192 of the mounting bracket 190. The threaded cap 200 may be threadably operably coupled to the aperture 192 to hold the bushing 210, the washer 242 and the fastener 240 in the aperture 192 of the mounting bracket 190, which may operably couple the damper 150 to the mounting bracket 190. In other words, the threaded cap 200 may retain all of the above components within the aperture 192 while the damper 150 may apply load forces to the upper strut mount 170 responsive to absorbing loading. In this regard, the first thread 270 may evenly distribute load forces from the damper 150 to the mounting bracket 190 via the second thread 280.

By implementing a threaded operable coupling between the threaded cap 200 and the mounting bracket 190, such as the one described herein between the first and second threads (270, 280), the load forces from the damper 150 may be distributed over a larger contact area (i.e. all of the area of the first and second threads 270, 280 that may be in contact with each other), which may reduce the amount, and the severity, of stress points formed in the mounting bracket 190 compared to the common practice described above. The previously used methods of operably coupling the cap to the mounting bracket 190 may localize the load forces from the damper 150 on the mounting bracket 190, which may have adverse effects on the longevity of the mounting bracket 190. As such, the implementation of the threaded cap 200 may seek to better distribute load forces from the damper 150 to increase the longevity and the load capacity of the mounting bracket 190.

In some cases, the threaded cap 200 may include a non-circular drive feature 202 disposed in a top portion of the threaded cap 200. This drive feature 202 may allow the threaded cap 200 to be driven into and out of its operable coupling with the mounting bracket 190. Additionally, the drive feature 202 may allow the threaded cap 200 to be driven to a predetermined amount of torque loading to securely operably couple the threaded cap 200 to the mounting bracket 190 without placing the threaded cap 200, the first thread 270, the mounting bracket 190 or the second thread 280, under any undue stresses. The drive feature 202 may also be large enough to enable a drive tool to be inserted through the threaded cap 200 and onto the fastener 240 to drive the fastener 240 as needed. In other words, the drive feature 202 may have a first diameter that may be larger than a second diameter of the fastener 240 by an amount that may enable a drive tool to be inserted through the drive feature 202 and onto the fastener 240 without engaging the drive feature 202 at all. This may reduce the likelihood to need to remove the threaded cap 200 to access the fastener 240, which may increase the efficiency of maintaining the suspension system 100. In some cases, the non-circular drive feature 202 may be hexagonal shaped. In an example embodiment, the drive feature 202 could be pentagonal, octagonal, star shaped, square shaped, triangular, torx shaped, rectangular, or any other shape capable of transferring torque from a driving tool to the threaded cap 200.

A strut assembly for a vehicle of an example embodiment may therefore be provided. The strut assembly may include a damper which may absorb compression and rebound loading along a longitudinal axis of the damper to reduce ride harshness, a lower strut mount which may operably couple the strut assembly to a control arm of the vehicle, and an upper strut mount which may operably couple the strut assembly to a body of the vehicle. The upper strut mount may include a mounting bracket which may operably couple the upper strut mount to the body, a threaded cap which may be operably coupleable to an aperture of the mounting bracket, and a bushing which may be disposed within the aperture of the mounting bracket to operably couple the damper to the mounting bracket. The threaded cap may include a first thread which may operably couple to the mounting bracket at a second thread which may be disposed at the aperture of the mounting bracket.

The strut assembly of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the threaded cap may hold the bushing in the aperture of the mounting bracket to operably couple the damper to the mounting bracket. In an example embodiment, the threaded cap may be disposed along the longitudinal axis of the damper. In some cases, the damper may apply a force onto the threaded cap responsive to the damper absorbing compression loading. In an example embodiment, the threaded cap may evenly distribute the force to the mounting bracket via the first and second threads. In some cases, the upper strut mount may further include a dust shield operably coupled to the threaded cap. In some cases, the dust shield may enclose and seal the aperture and the threaded cap. In an example embodiment, the threaded cap may include a non-circular drive feature which may enable the threaded cap to be driven into and out of operable coupling with the mounting bracket. In some cases, the bushing may be operably coupled to the damper via a fastener and a washer. In an example embodiment, a first diameter of the non-circular drive feature may be larger than a second diameter of the fastener by an amount that may enable a drive tool to be inserted through the non-circular drive feature to drive the fastener without engaging the non-circular drive feature of the threaded cap.

An upper strut mount for a strut assembly for a vehicle of an example embodiment may therefore be provided. The upper strut mount may include a mounting bracket which may operably couple the upper strut mount to the body, a threaded cap which may be operably coupleable to an aperture of the mounting bracket, and a bushing which may be disposed within the aperture of the mounting bracket to operably couple the damper to the mounting bracket. The threaded cap may include a first thread which may operably couple to the mounting bracket at a second thread which may be disposed at the aperture of the mounting bracket.

A suspension system for a vehicle of an example embodiment may therefore be provided. The suspension system may include a wheel operably coupled to a control arm, a body of the vehicle, and a strut assembly which may be disposed between the control arm and the body. The strut assembly may include a damper which may absorb compression and rebound loading along a longitudinal axis of the damper to reduce ride harshness, a lower strut mount which may operably couple the strut assembly to a control arm of the vehicle, and an upper strut mount which may operably couple the strut assembly to a body of the vehicle. The upper strut mount may include a mounting bracket which may operably couple the upper strut mount to the body, a threaded cap which may be operably coupleable to an aperture of the mounting bracket, and a bushing which may be disposed within the aperture of the mounting bracket to operably couple the damper to the mounting bracket. The threaded cap may include a first thread which may operably couple to the mounting bracket at a second thread which may be disposed at the aperture of the mounting bracket.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to shortcomings are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A strut assembly for a vehicle, the strut assembly comprising:
   a damper to absorb compression and rebound loading along a longitudinal axis of the damper;
   a lower strut mount to operably couple the strut assembly to a control arm of the vehicle, and
   an upper strut mount to operably couple the strut assembly to a body of the vehicle,
   wherein the upper strut mount comprises:
      a mounting bracket to operably couple the upper strut mount to the body,
      a threaded cap operably coupleable to an aperture of the mounting bracket, and
      a bushing disposed within the aperture of the mounting bracket to operably couple the damper to the mounting bracket,
   wherein the threaded cap comprises a first thread which operably couples to the mounting bracket at a second thread disposed at the aperture of the mounting bracket,
   wherein the threaded cap comprises a non-circular drive feature to enable the threaded cap to be driven into and out of operable coupling with the mounting bracket,
   wherein the bushing is operably coupled to the damper via a fastener and a washer, and
   wherein a first diameter of the non-circular drive feature is larger than a second diameter of the fastener by an amount that enables a drive tool to be inserted through the non-circular drive feature to drive the fastener without engaging the non-circular drive feature of the threaded cap.

2. The strut assembly of claim 1, wherein the threaded cap holds the bushing in the aperture of the mounting bracket to operably couple the damper to the mounting bracket.

3. The strut assembly of claim 1, wherein the threaded cap is disposed along the longitudinal axis of the damper.

4. The strut assembly of claim 1, wherein the damper applies a force onto the threaded cap responsive to the damper absorbing compression loading, and
   wherein the threaded cap evenly distributes the force to the mounting bracket via the first and second threads.

5. The strut assembly of claim 1, wherein the upper strut mount further comprises a dust shield operably coupled to the threaded cap, and
   wherein the dust shield encloses and seals the aperture and the threaded cap.

6. An upper strut mount for a strut assembly of a vehicle, the upper strut mount comprising:
   a mounting bracket to operably couple the upper strut mount to the body;
   a threaded cap operably coupled to an aperture of the mounting bracket; and
   a bushing disposed within the aperture of the mounting bracket to operably couple a damper to the mounting bracket,
   wherein the threaded cap comprises a first thread which operably couples to the mounting bracket at a second thread disposed at the aperture of the mounting bracket,
   wherein the threaded cap comprises a non-circular drive feature to enable the threaded cap to be driven into and out of operable coupling with the mounting bracket,
   wherein the bushing is operably coupled to the damper via a fastener and a washer, and
   wherein a first diameter of the non-circular drive feature is larger than a second diameter of the fastener by an amount that enables a drive tool to be inserted through the non-circular drive feature to drive the fastener without engaging the non-circular drive feature of the threaded cap.

7. The upper strut mount of claim 6, wherein the threaded cap holds the bushing in the aperture of the mounting bracket to operably couple the damper to the mounting bracket.

8. The upper strut mount of claim 6, wherein the threaded cap is disposed along the longitudinal axis of the damper.

9. The upper strut mount of claim 6, wherein the damper applies a force onto the threaded cap responsive to the damper absorbing compression loading, and
   wherein the threaded cap evenly distributes the force to the mounting bracket via the first and second threads.

10. The upper strut mount of claim 6, wherein the upper strut mount further comprises a dust shield operably coupled to the threaded cap, and
    wherein the dust shield encloses and seals the aperture and the threaded cap.

11. A suspension system of a vehicle, the suspension system comprising:
    a wheel operably coupled to a control arm;
    a body of the vehicle; and
    a strut assembly disposed between the control arm and the body, the strut assembly comprising:
    a damper to absorb compression and rebound loading along a longitudinal axis of the damper;
    a lower strut mount to operably couple the strut assembly to the control arm; and
    an upper strut mount to operably couple the strut assembly to the body,
    wherein the upper strut mount comprises:
       a mounting bracket operably coupling the upper strut mount to the body,
       a threaded cap operably coupled to an aperture of the mounting bracket, and
       a bushing disposed within the aperture of the mounting bracket to operably couple the damper to the mounting bracket,
    wherein the threaded cap comprises a first thread which operably couples to the mounting bracket at a second thread disposed at the aperture of the mounting bracket,
    wherein the threaded cap comprises a non-circular drive feature to enable the threaded cap to be driven into and out of operable coupling with the mounting bracket,
    wherein the bushing is operably coupled to the damper via a fastener and a washer, and
    wherein a first diameter of the non-circular drive feature is larger than a second diameter of the fastener by an amount that enables a drive tool to be inserted through the non-circular drive feature to drive the fastener without engaging the non-circular drive feature of the threaded cap.

12. The suspension system of claim 11, wherein the threaded cap holds the bushing in the aperture of the mounting bracket to operably couple the damper to the mounting bracket.

13. The suspension system of claim 11, wherein the threaded cap is disposed along the longitudinal axis of the damper.

14. The suspension system of claim 11, wherein the damper applies a force onto the threaded cap responsive to the damper absorbing compression loading, and
    wherein the threaded cap evenly distributes the force to the mounting bracket via the first and second threads.

15. The suspension system of claim 11, wherein the upper strut mount further comprises a dust shield operably coupled to the threaded cap, and
wherein the dust shield encloses and seals the aperture and the threaded cap.

\* \* \* \* \*